US008879691B2

(12) United States Patent
Ploumen et al.

(10) Patent No.: US 8,879,691 B2
(45) Date of Patent: Nov. 4, 2014

(54) AUTONOMOUS METALLIC SUPERVISION WITH SEALING CURRENT

(75) Inventors: Franciscus Maria Ploumen, Winsor, CA (US); Paul Franceschini, Petaluma, CA (US)

(73) Assignee: Alcatel Lucent, Boulogne-Billancourt (FR)

( * ) Notice: Subject to any disclaimer, the term of this patent is extended or adjusted under 35 U.S.C. 154(b) by 2306 days.

(21) Appl. No.: 11/315,514

(22) Filed: Dec. 22, 2005

(65) Prior Publication Data

US 2007/0147591 A1 Jun. 28, 2007

(51) Int. Cl.
*H04M 1/24* (2006.01)
*H04M 3/30* (2006.01)
*H04M 11/06* (2006.01)
*H04M 19/00* (2006.01)

(52) U.S. Cl.
CPC ............ *H04M 3/305* (2013.01); *H04M 11/062* (2013.01); *H04M 19/001* (2013.01)
USPC .................................... 379/14.01; 379/22.01

(58) Field of Classification Search
CPC ....... H04M 1/24; H04M 3/305; H04M 1/745; H04M 2201/16; H04M 3/08; H04M 3/22; H04M 3/304; H04L 12/2697; H04L 43/50; G06F 11/2294
USPC ........ 379/377, 27.01–27.04, 1.01, 1.03, 1.04, 379/14.01, 15.05, 10.01, 12, 19, 21, 379/22.01–22.06, 25, 27.07, 28, 379/29.01–29.05, 30, 31, 32.01, 32.02
See application file for complete search history.

(56) References Cited

U.S. PATENT DOCUMENTS

| 4,984,250 | A | * | 1/1991 | Koyama ........................ 375/257 |
| 5,442,697 | A | | 8/1995 | McGary et al. |
| 5,642,412 | A | * | 6/1997 | Reymond ...................... 379/348 |
| 6,532,277 | B2 | * | 3/2003 | Ulanskas et al. ........... 379/27.01 |
| 7,365,547 | B2 | * | 4/2008 | Ferianz ......................... 324/538 |
| 2002/0041657 | A1 | * | 4/2002 | Ulanskas et al. ........... 379/27.01 |
| 2002/0094077 | A1 | * | 7/2002 | Kunisch ................... 379/387.01 |
| 2004/0161100 | A1 | * | 8/2004 | Menasco, Jr. ................ 379/377 |
| 2005/0163308 | A1 | | 7/2005 | Smith et al. |
| 2006/0072606 | A1 | * | 4/2006 | Posthuma .................... 370/463 |
| 2007/0116257 | A1 | * | 5/2007 | Duran et al. .................. 379/413 |

FOREIGN PATENT DOCUMENTS

| CN | 1571521 A | 1/2005 |
| WO | 0135610 A1 | 5/2001 |
| WO | 2006052288 A1 | 5/2006 |

* cited by examiner

*Primary Examiner* — Akelaw Teshale
(74) *Attorney, Agent, or Firm* — RGIP LLC

(57) ABSTRACT

A system, method, and computer readable medium for a metallic test method in a digital subscriber line system in which a subscriber's voice service has been switched from plain old telephony service to an inband digital subscriber line data stream characterized in that a direct current loop current used for plain old telephony service is replicated for testing, comprising, providing a sealing line current to a transmission line via a digital subscriber line device serving the subscriber and supervising the provided sealing line current between the digital subscriber line device and a subscriber's premises for determining a connectivity therebetween.

24 Claims, 3 Drawing Sheets

AUTONOMOUS METALLIC SUPERVISION WITH SEALING CURRENT

BACKGROUND OF THE INVENTION

The present invention is generally related to utilization of sealing current on Digital Subscriber Lines (DSL) without Plain Old Telephony Service (POTS) to test metallic line integrity and, more specifically, to an autonomous metallic supervision with sealing current of DSL lines without underlying POTS.

With the increase in use of cellular phones and Voice over Internet Protocol (VoIP), many residences and other users are discontinuing their use of POTS. DSL was initially created to be used in conjunction with POTS, where POTS utilized the frequency band below 4 Kilo Hertz (KHz) and DSL utilized the frequency band above 4 kHz. POTS utilizes a sealing or wetting current which is a direct current injected into a line to prevent galvanic corrosion of metallic (copper) lines and to prevent oxidation at splices. With the switch by residences to utilize DSL without underlying POTS, the benefits of the sealing or wetting current built into POTS is no longer present. Such a use of DSL without underlying POTS is referred to as dry DSL as there is no wetting current injected into the line.

Therefore, what is needed is dry DSL metallic connectivity testing with sealing current. More specifically, what is needed is autonomous metallic supervision with sealing current of DSL lines without underlying POTS that overcomes the limitations described above. The present invention injects a wetting (sealing) current into dry DSL lines to allow measurement of Direct Current (DC) loop resistances and to provide the benefits of corrosion and oxidation resistance previously only enjoyed from utilizing POTS. The measurement of DC loop resistance allows insight into metallic connectivity integrity of the dry DSL connection.

SUMMARY OF THE INVENTION

POTS utilizes sealing current to prevent corrosion and oxidation of metallic lines and splices. POTS inherently provides wetting current by means of an off-hook loop current. Sealing current is alternatively termed wetting current. Sealing current is the minimum amount of electric current necessary to keep mechanical switch contacts from undergoing galvanic corrosion. Sealing current reduces oxidation at line splices and reduces galvanic corrosion which causes contacts to gain excessive resistance and prematurely fail. The sealing current is direct current injected into the line. POTS termination devices such as Subscriber Line Integrated Circuits (SLICs) measure loop impedance in order to detect ON/OFF hook. Measuring a Direct Current (DC) loop resistance is part of normal POTS operation.

Digital Subscriber Line Access Multiplexers (DSLAMs) designed as an overlay for existing POTS networks, typically consist of DSL transceivers and POTS splitters. The POTS splitter consists of a High Pass (HP) and a Low Pass (LP) filter. The POTS splitter is designed to separate narrow band voice and broad band DSL signals and avoid interference. The high pass filter is situated between the twisted pair and the DSL transceiver while the low pass filter is situated between the POTS and narrow band Message Listener Type (MLT) test equipment and the telephone line.

The present invention is a cost effective methodology to ensure metallic connection from DSLAMs to customer premises by reusing sealing current infrastructure. Verifying a proper metallic connection from DSLAMs to customer premises is implicitly done during DSL Showtime. DSL Showtime is used to describe a scenario where a user and a network can begin communications over an access network. In instances where DSL Showtime is not possible, another technique would be required to diagnose if a problem that occurred was related to metallic issue. One method of diagnosing a metallic issue is to add a test signature at the customer premises. Test heads at a central office (CO) are typically capable of detecting this type of signature and thus provide feedback on metallic connectivity from the test head to the demarcation point at the customer premises where the test signature is installed. Asymmetric Digital Subscriber Line (ADSL) and Very High Rate Digital Subscriber Line (VDSL) circuitry is inserted into the line via a high pass filter and has no visibility to DC. Therefore it can not measure DC loop resistance like POTS SLICs can.

Adding a test signature at the customer premises adds cost and requires a test head to detect it. DSL can also operate in an environment where the underlying POTS is no longer present. In such a scenario, also known as Dry DSL, voice services can for instance be delivered inband the DSL data stream via technologies such as Voice over Internet Protocol (VoIP). By removing POTS from the line, the DC loop current that is part of normal POTS operation disappears. In the present invention, dry DSL DC loop current is provided to seal the line and prevent corrosion.

Further, in the present invention the DSLAM provides sealing current for dry DSL lines to additionally perform the metallic connectivity test by measuring the loop current from the Sealing Current source (SC) to the Sealing Termination (ST). If the measured current is too low, then the DC resistance is too high, indicating a problem. Every time sealing current is applied to a line, the measurement can be applied. Consequently, an applied sealing current will implicitly provide a metallic connectivity check. Detected problems can be reported to a central office via autonomous alarms. Upon such notification, the CO can decide whether further investigation is required and issue a standard metallic test procedure.

The present invention also provides a method to report metallic faults autonomously without additional hardware cost, to autonomously report metallic faults without the need for regular testing by a test head. Further, no additional cost are added to DSLAMs that already support sealing current. As VoIP technologies mature, DSL speeds increase and Class 5 switches age, VoIP will become a more viable alternative to POTS and Dry DSL lines will need to support sealing current.

In one embodiment of the present invention, a metallic test method in a digital subscriber line system in which a subscriber's voice service has been switched from plain old telephony service to an inband digital subscriber line data stream, wherein a direct current loop current used for plain old telephony service is replicated for testing, comprises: providing a sealing line current to a transmission line via a digital subscriber line device serving the subscriber and supervising the provided sealing line current between the digital subscriber line device and a subscriber's premises for determining a connectivity therebetween. The system may measure a leakage current of the supervised sealing line current, measure a return voltage of the supervised sealing line current and measure a loop resistance between the digital subscriber line device and the subscriber's premises. The sealing current may be provided continuously, intermittently or during periods when the digital subscriber line device is utilized during the subscriber's voice service. The method may also send an alert based upon the determined connectivity.

In another embodiment of the present invention, a method of testing metallic integrity of a transmission line of a dry digital subscriber line system, comprising: providing a sealing line current to the transmission line and measuring a loop resistance of the transmission line to determine a connectivity of the transmission line. The sealing line current may be direct current. The method may additionally measure a leakage current of the transmission line and a return voltage of the transmission line. The sealing current may be provided continuously, intermittently or during periods when the digital subscriber line device is utilized during the subscriber's voice service. The method may also send an alert based upon the determined connectivity.

In a further embodiment of the present invention, a computer readable medium comprises instructions for: providing a sealing line current from a digital subscriber line access multiplexer to a transmission line of a dry digital subscriber line and measuring a loop resistance from the digital subscriber line access multiplexer to a subscriber's premises. The computer readable medium may provide instructions for determining a connectivity of the transmission line based upon the measured loop resistance, for measuring a leakage current of the transmission line, for measuring a return voltage of the transmission line and for sending an alert based upon the measured loop resistance.

In yet a further embodiment, a system adapted to provide testing metallic integrity of a transmission line of a dry digital subscriber line system, comprises: a digital subscriber line access multiplexer coupled to the transmission line and a sealing line current source coupled to the digital subscriber line access multiplexer. The sealing current may be direct current. The system may include a low pass filter connected to the sealing line current source, a sealing termination coupled to the transmission line, a resistance measurement device coupled to the transmission line to measure a loop resistance, a voltage measurement device coupled to the transmission line to measure a return voltage and a current measurement device coupled to the transmission line to measure a leakage current.

DETAILED DESCRIPTION OF THE INVENTION

Figure 1:
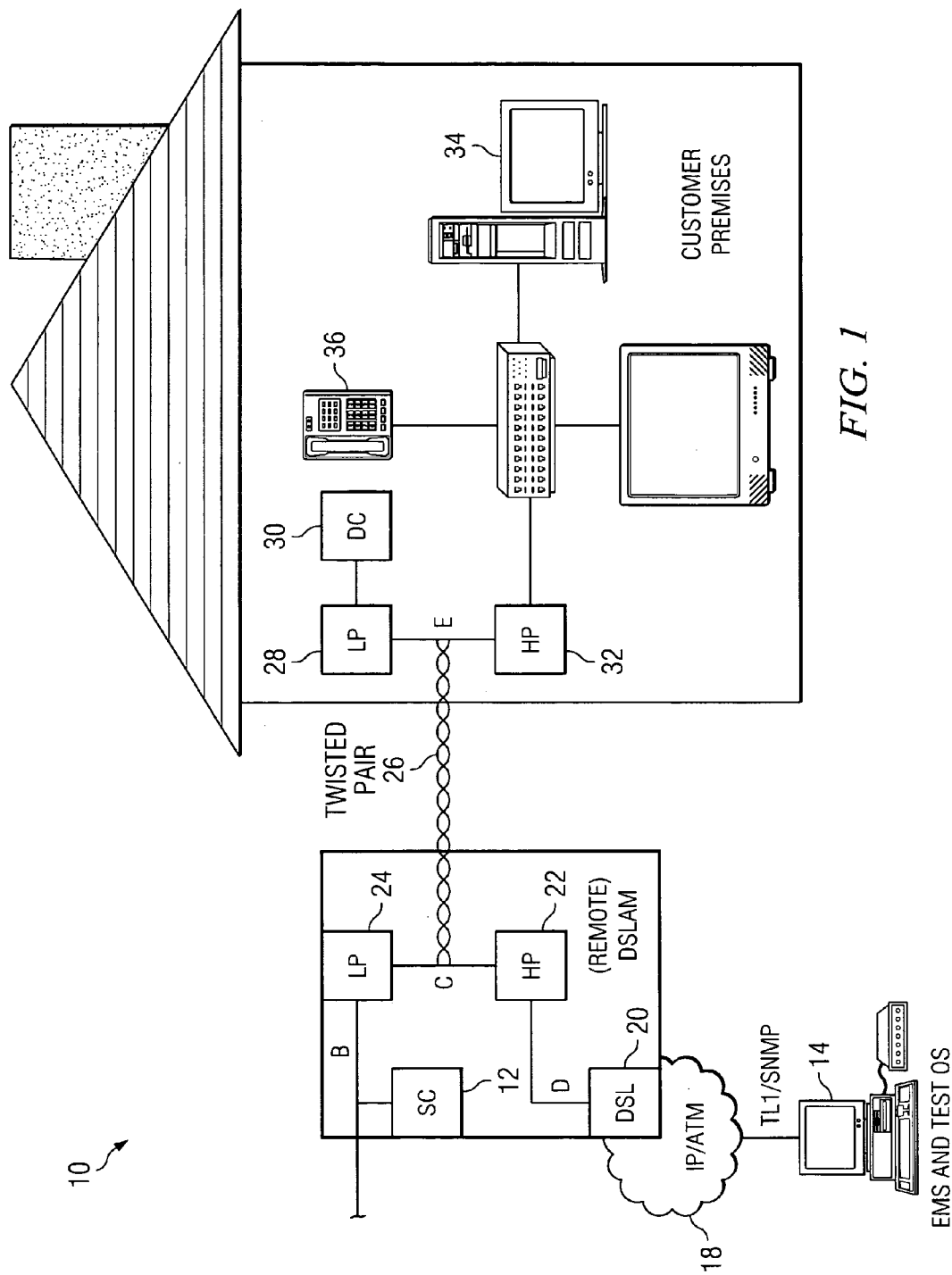
FIG. 1 depicts a system adapted to provide testing metallic integrity of a transmission line of a dry digital subscriber line system in accordance with a preferred embodiment of the present invention.

Referring now to FIG. 1, a method of testing 10 metallic integrity of a transmission line of a dry digital subscriber line system is depicted. The system shown is the dry DSL system in which the communication from a DSLAM to a customer's premises does not have an underlying POTS system. POTS utilizes a sealing (wetting) line current which is a direct current injected into the transmission line to prevent galvanic corrosion of metallic (copper) lines and to prevent oxidation at splices. This sealing line current is injected into the transmission line from a sealing line current source 12. With the transition by many residences to utilize DSL without underlying POTS the benefits of the sealing or wetting current built into POTS is no longer present. The present invention injects the wetting (sealing) current into dry DSL lines to allow measurement of Direct Current (DC) loop resistances and to provide the benefits of corrosion and oxidation resistance previously only enjoyed from utilizing POTS.

An Access Management System (AMS) 14 is communicably coupled to a Test Operating System (Test-OS) 16 and to the DSLAM 18. DSLAMs were designed as overlay for existing POTS networks, typically consisting of a downstream DSL transceiver 20 and a downstream POTS splitter. The downstream POTS splitter consists of a downstream High Pass 22 (HP) and a downstream Low Pass (LP) 24 filter. The downstream POTS splitter is designed to separate narrow band voice, low frequency, and broad band DSL signals, high frequency, to avoid interference. The downstream high pass filter 22 is situated between the transmission line 26 (twisted pair) and the downstream DSL transceiver 20 while the downstream low pass filter 24 is situated between the transmission line 26 and the sealing line current source 12. The transmission line 26 communicably couples the DSLAM 18 to the customer's premises. The transmission line 26 is coupled to an upstream high pass filter 32 which can communicate broad band signals to an IP configured devices 34 including a VoIP 36 capable device. The transmission line 26 is coupled to the upstream low pass filter 28 which terminates at a sealing termination 30. These blocks or modules are software, hardware, firmware, and/or the combination of software, hardware, and/or firmware.

The transfer of information between the DSLAM and the customer's premises occurs via at least one of the wireless protocol, the wired protocol and the combination of the wireless protocol and the wired protocol. For example, the presence infrastructure may be accessed by the cellular phone or the computer with external wireless capability (such as the wireless card) or internal wireless capability (such as 802.11 or any of the other 802 variants), or by the Internet Protocol enabled phone.

Figure 2:
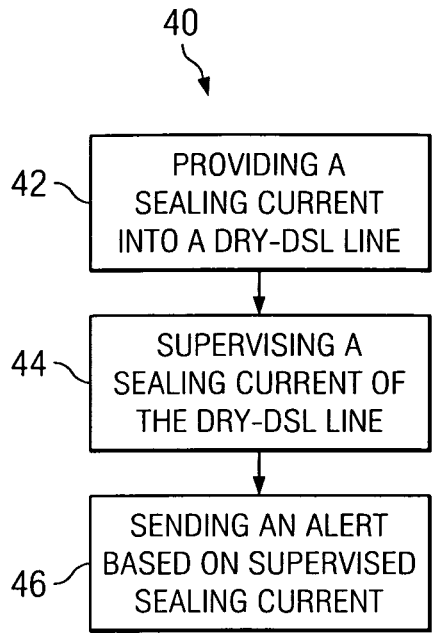
FIG. 2 depicts a first method of testing metallic integrity of a transmission line of a dry digital subscriber line system in accordance with a preferred embodiment of the present invention.

Referring now to FIG. 2, the first method of testing 40 metallic integrity of the transmission line of the dry digital subscriber line system in accordance with the preferred embodiment of the present invention is depicted. The sealing current is provided 42 to the dry DSL line. The sealing current is supervised 44 between the DSLAM and the customer's premises to determine whether corrosion or the current leakage is occurring and an alert is sent 46 based upon the supervised sealing current. These blocks or modules are software, hardware, firmware, and/or the combination of software, hardware, and/or firmware. The transfer of information between the DSLAM and the customer's premises occurs via at least one of the wireless protocol, the wired protocol and the combination of the wireless protocol and the wired protocol.

Figure 3:
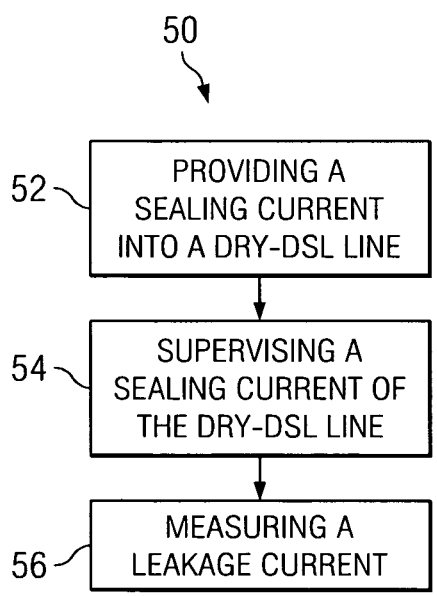
FIG. 3 depicts a second method of testing metallic integrity of a transmission line of a dry digital subscriber line system in accordance with a preferred embodiment of the present invention.

Referring now to FIG. 3, the second method of testing 50 metallic integrity of the transmission line of the dry digital subscriber line system in accordance with the preferred embodiment of the present invention is depicted. The sealing current is provided 52 to the dry DSL line. The sealing current is supervised 54 between the DSLAM and the customer's premises to determine whether corrosion or the current leakage is occurring and a leakage current is measured 56. These blocks or modules are software, hardware, firmware, and/or the combination of software, hardware, and/or firmware. The transfer of information between the DSLAM and the customer's premises occurs via at least one of the wireless protocol, the wired protocol and the combination of the wireless protocol and the wired protocol.

Figure 4:
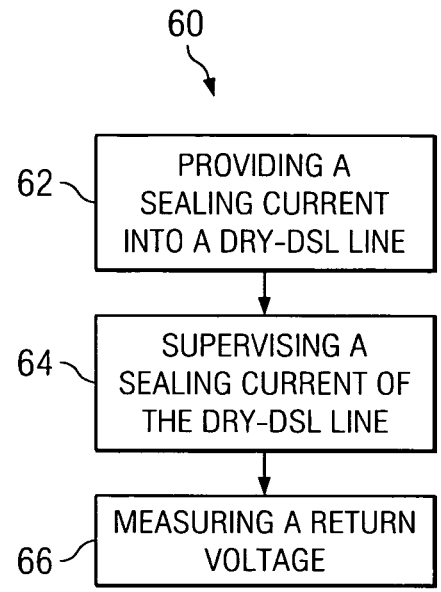
FIG. 4 depicts a third method of testing metallic integrity of a transmission line of a dry digital subscriber line system in accordance with a preferred embodiment of the present invention.

Referring now to FIG. 4, the third method of testing 60 metallic integrity of the transmission line of the dry digital subscriber line system in accordance with the preferred embodiment of the present invention is depicted. The sealing current is provided 62 to the dry DSL line. The sealing current is supervised 64 between the DSLAM and the customer's premises to determine whether corrosion or the current leakage is occurring and a return voltage is measured 66. These blocks or modules are software, hardware, firmware, and/or the combination of software, hardware, and/or firmware. The transfer of information between the DSLAM and the customer's premises occurs via at least one of the wireless protocol, the wired protocol and the combination of the wireless protocol and the wired protocol.

Figure 5:
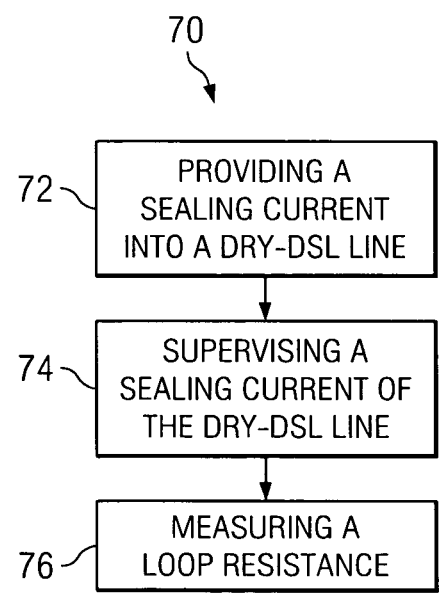
FIG. 5 depicts a fourth method of testing metallic integrity of a transmission line of a dry digital subscriber line system in accordance with a preferred embodiment of the present invention.
Figure 6:
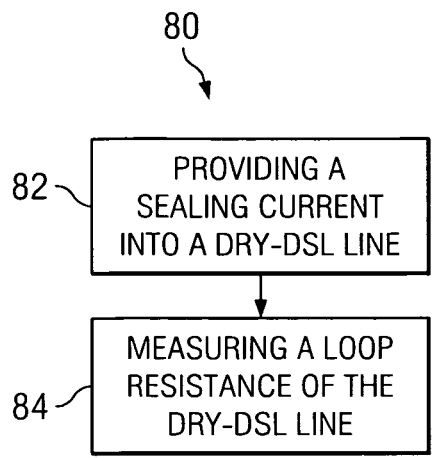
FIG. 6 depicts a first software flow block of testing metallic integrity of a transmission line of a dry digital subscriber line system in accordance with a preferred embodiment of the present invention.
Figure 7:
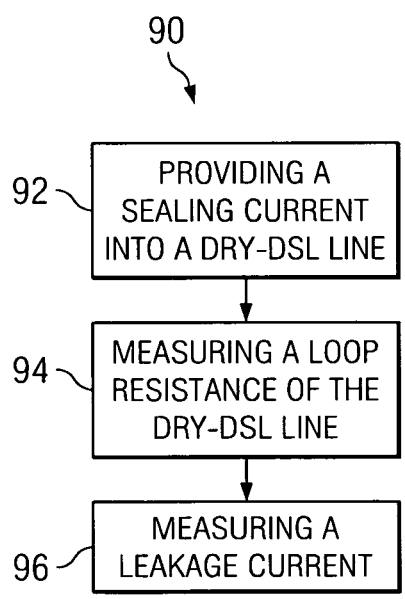
FIG. 7 depicts a second software flow block of testing metallic integrity of a transmission line of a dry digital subscriber line system in accordance with a preferred embodiment of the present invention.
Figure 8:
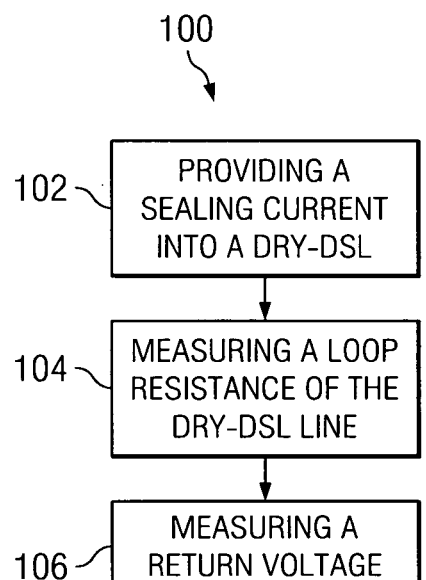
FIG. 8 depicts a third software flow block of testing metallic integrity of a transmission line of a dry digital subscriber line system in accordance with a preferred embodiment of the present invention.

Referring now to FIG. 5, the fourth method of testing 70 metallic integrity of the transmission line of the dry digital subscriber line system in accordance with the preferred embodiment of the present invention is depicted. The sealing current is provided 72 to the dry DSL line. The sealing current is supervised 74 between the DSLAM and the customer's premises to determine whether corrosion or the current leakage is occurring and a loop resistance is measured 76. These blocks or modules are software, hardware, firmware, and/or the combination of software, hardware, and/or firmware. The transfer of information between the DSLAM and the customer's premises occurs via at least one of the wireless protocol, the wired protocol and the combination of the wireless protocol and the wired protocol.

The first computer readable medium of the method 80 of testing metallic integrity of the transmission line of the dry digital subscriber line is depicted. This algorithm is preferably embodied in the computer readable medium or software but may also be embodied in firmware and is utilized via hardware. The algorithm includes the steps of providing 82 the sealing current into the dry DSL transmission line and measuring 84 the loop resistance of the dry DSL transmission line to determine connectivity of the dry DSL transmission line.

The second computer readable medium of the method 90 of testing metallic integrity of the transmission line of the dry digital subscriber line is depicted. This algorithm is preferably embodied in the computer readable medium or software but may also be embodied in firmware and is utilized via hardware. The algorithm includes the steps of providing 92 the sealing current into the dry DSL transmission line, measuring 94 the loop resistance of the dry DSL transmission line to determine connectivity of the dry DSL transmission line and measuring 96 the leakage current of the DSL transmission line.

The third computer readable medium of the method 100 of testing metallic integrity of the transmission line of the dry digital subscriber line is depicted. This algorithm is preferably embodied in the computer readable medium or software but may also be embodied in firmware and is utilized via hardware. The algorithm includes the steps of providing 102 the sealing current into the dry DSL transmission line, measuring 104 the loop resistance of the dry DSL transmission line to determine connectivity of the dry DSL transmission line and measuring 106 the return voltage of the DSL transmission line.

Although the exemplary embodiment of the system of the present invention has been illustrated in the accompanied drawings and described in the foregoing detailed description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the DSLAMs. Also, these capabilities may be performed in the current manner or in the distributed manner and on, or via, any device able to provide and/or receive broadband signals. Further, although depicted in the particular manner, various modules or blocks may be repositioned without departing from the scope of the current invention. For example, the functionality performed by the DSLAM can be self contained. Still further, although depicted in the particular manner, the greater or lesser number of customer's devices, DSLAMs, high pass filters, low pass filters and access management systems can be utilized with the present invention. Further, the lesser or greater number of DSLAMs may be utilized with the present invention and such DSLAMs may include known complementary functionality in order to accomplish the present invention, to provide additional known features to the present invention, and/or to make the present invention more efficient.

What is claimed is:

1. A method of testing metallic integrity in a dry digital subscriber line system in which a subscriber's voice service has been switched from plain old telephony service to an inband digital subscriber line data stream characterized in that a direct current loop current used for plain old telephony service is replicated for testing, comprising:

providing a sealing line current to a dry transmission line via a dry digital subscriber line device serving the subscriber, the sealing line current provided from a sealing current source coupled to the dry transmission line via a low pass filter, the sealing current source and the low pass filter located in a remote digital subscriber line access multiplexer (DSLAM);

supervising the provided sealing line current between the digital subscriber line device and a subscriber's premises for determining the metallic integrity and a connectivity of the dry transmission line, and for determining whether a leakage current is occurring; and measuring a loop resistance of the dry digital subscriber line based on the provided sealing line current to determine the connectivity of the dry transmission line.

2. The method of claim 1 comprising measuring a return voltage of the supervised sealing line current.

3. The method of claim 1 wherein the provision of the sealing line current is continuous.

4. The method of claim 1 wherein the provision of the sealing line current is intermittent.

5. The method of claim 1 wherein the provision of the sealing line current occurs during periods when the digital subscriber line device is utilized during the subscriber's voice service.

6. The method of claim 1 comprising sending an alert based upon the determined connectivity.

7. A method of testing metallic integrity of a transmission line of a dry digital subscriber line system, comprising:
  providing a sealing line current to the transmission line; the sealing line current provided from a sealing current source Coupled to the transmission line via a low pass filter, the sealing current source and the low pass filter located in a remote digital subscriber line access multiplexer (DSLAM);
  supervising the sealing current to determine whether corrosion or current leakage is occurring; and
  measuring a loop resistance of the transmission line based on the provided sealing line current to determine the metallic integrity and a connectivity of the transmission line.

8. The method of claim 7 wherein the sealing line current is a direct current.

9. The method of claim 8 comprising measuring a leakage current of the transmission line.

10. The method of claim 8 comprising measuring a return voltage of the transmission line.

11. The method of claim 8 wherein the provision of the sealing line current is continuous.

12. The method of claim 8 wherein the provision of the sealing line current is intermittent.

13. The method of claim 8 wherein the provision of the sealing line current occurs during periods when the dry digital subscriber line system is utilized performing the function of a voice service.

14. A non-transitory computer readable storage medium comprising instructions that when executed cause a processor to perform:
  providing a sealing line current from a dry digital subscriber line access multiplexer (DSLAM) to a dry transmission line of a dry digital subscriber line, the sealing line current provided from a sealing current source coupled to the dry transmission line via a low pass filter, the sealing current source and the low pass filter located in the dry digital subscriber line access multiplexer;
  supervising the provided sealing line current between the digital subscriber line device and a subscriber's premises for determining whether a leakage current is occurring; and
  measuring a loop resistance of the dry digital subscriber line based on the provided sealing line current to determine connectivity, metallic integrity and to determine whether corrosion has occurred from the dry digital subscriber line access multiplexer (DSLAM) to a subscriber's premises.

15. The non-transitory computer readable storage medium of claim 14 comprising instructions for determining a connectivity of the transmission line based upon the measured loop resistance.

16. The non-transitory computer readable storage medium of claim 14 comprising instructions for measuring a return voltage of the transmission line.

17. The non-transitory computer readable storage medium of claim 14 comprising instructions for sending an alert based upon the measured loop resistance.

18. A system adapted to provide testing metallic integrity of a transmission line of a dry digital subscriber line system, comprising:
  a digital subscriber line access multiplexer (DSLAM) coupled to the transmission line; and
  a sealing line current source coupled to the digital subscriber line access multiplexer, wherein the sealing line current is provided to a dry digital subscriber line of the DSLAM to determine metallic integrity;
  wherein the digital subscriber line access multiplexer comprises a high pass filter and a low pass filter;
  wherein the high pass filter is coupled between the transmission line and a digital subscriber line device;
  wherein the low pass filter is coupled between the transmission line and the sealing line current source;
  wherein the sealing line current source is coupled to the dry transmission line via the low pass filter, and the sealing current source and the low pass filter are located in the DSLAM; and
  wherein the sealing line current source is configured to supervise the provided sealing line current between the DSLAM and a subscriber's premises for determining the metallic integrity and a connectivity of the dry transmission line, and for determining whether a leakage current is occurring, and to measure a loop resistance of the dry digital subscriber line to determine the connectivity of the dry transmission line.

19. The system of claim 18 wherein the sealing line current is direct current.

20. The system of claim 19 comprising a low pass filter connected to the sealing line current source.

21. The system of claim 20 comprising a sealing termination coupled to the transmission line.

22. The system of claim 21 comprising a resistance measurement device coupled to the transmission line to measure the loop resistance.

23. The system of claim 21 comprising a voltage measurement device coupled to the transmission line to measure a return voltage.

24. The system of claim 21 comprising a current measurement device coupled to the transmission line to measure the leakage current, and to produce a presentity inferred state.

* * * * *